(12) United States Patent
Toy

(10) Patent No.: US 11,201,791 B2
(45) Date of Patent: Dec. 14, 2021

(54) OPTIMUM RESOURCE ALLOCATION AND DEVICE ASSIGNMENT IN A MEC CLUSTER

(71) Applicant: Verizon Patent and Licensing Inc., Washington, DC (US)

(72) Inventor: Mehmet Toy, Allendale, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/828,628

(22) Filed: Mar. 24, 2020

(65) Prior Publication Data

US 2021/0306219 A1   Sep. 30, 2021

(51) Int. Cl.
*H04L 12/24*    (2006.01)
*H04L 29/08*    (2006.01)
*H04L 12/26*    (2006.01)
*H04L 12/911*   (2013.01)

(52) U.S. Cl.
CPC ...... *H04L 41/0896* (2013.01); *H04L 41/0893* (2013.01); *H04L 41/12* (2013.01); *H04L 43/0864* (2013.01); *H04L 47/70* (2013.01); *H04L 67/10* (2013.01)

(58) Field of Classification Search
CPC . H04L 41/0896; H04L 41/0893; H04L 41/12; H04L 43/0864; H04L 47/70; H04L 67/10

USPC .......................................................... 370/252
See application file for complete search history.

(56) References Cited

U.S. PATENT DOCUMENTS

| | | | |
|---|---|---|---|
| 2013/0173806 A1* | 7/2013 | Newton | H04L 67/1025 709/226 |
| 2014/0233387 A1* | 8/2014 | Zheng | H04L 47/125 370/235 |
| 2015/0365328 A1* | 12/2015 | Luke | H04L 45/74 370/238 |
| 2017/0279877 A1* | 9/2017 | Chang | H04L 67/101 |
| 2018/0288141 A1* | 10/2018 | Mo | H04L 67/2842 |

* cited by examiner

*Primary Examiner* — Meng Vang
*Assistant Examiner* — Chong G Kim

(57) ABSTRACT

A network device in a Multi-Access Edge Computing (MEC) cluster may receive a request for a service that requires use of a resource of a first type; and determine whether a resource utilization level, associated with the resource, at a MEC device in the MEC cluster exceeds a threshold. When the network device determines that the resource utilization level exceeds the threshold, the network device may determine whether a candidate MEC device is available within the MEC cluster to provide a resource of the first type; and enable the service to be provided.

20 Claims, 7 Drawing Sheets

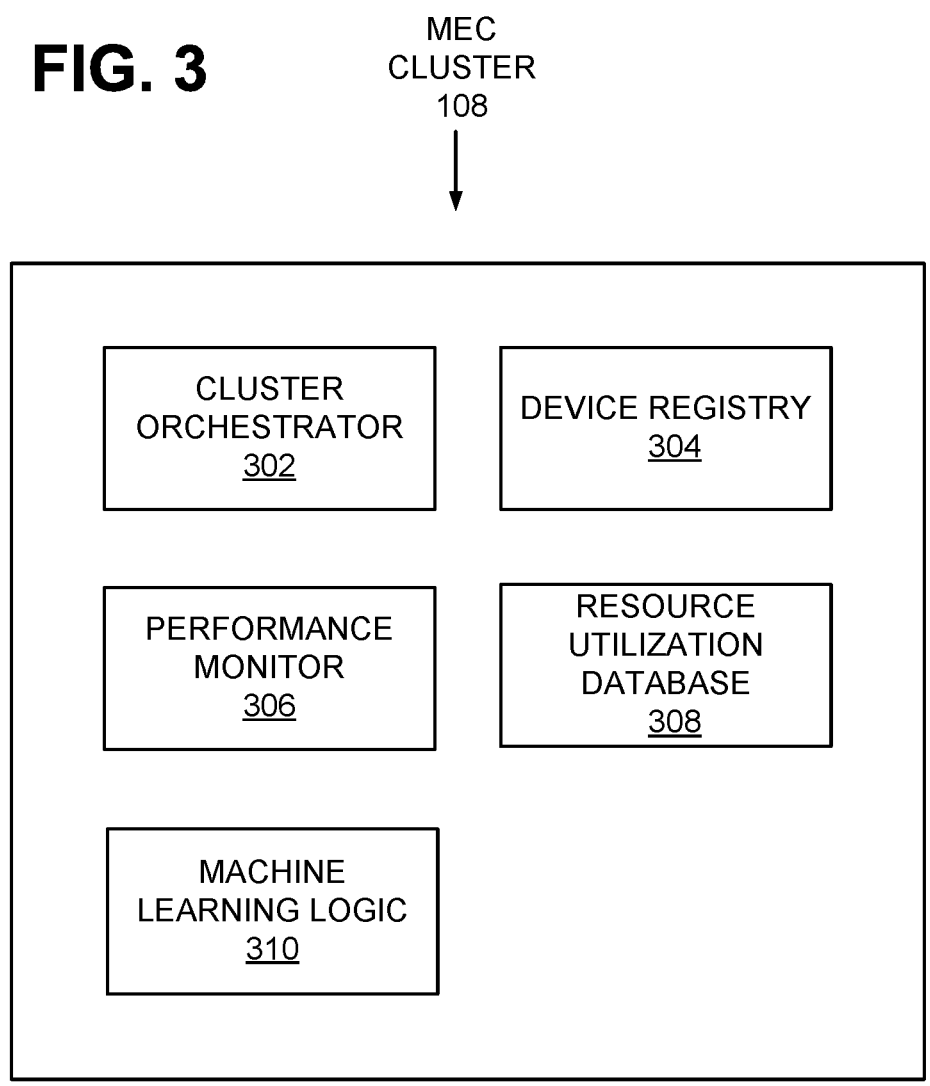

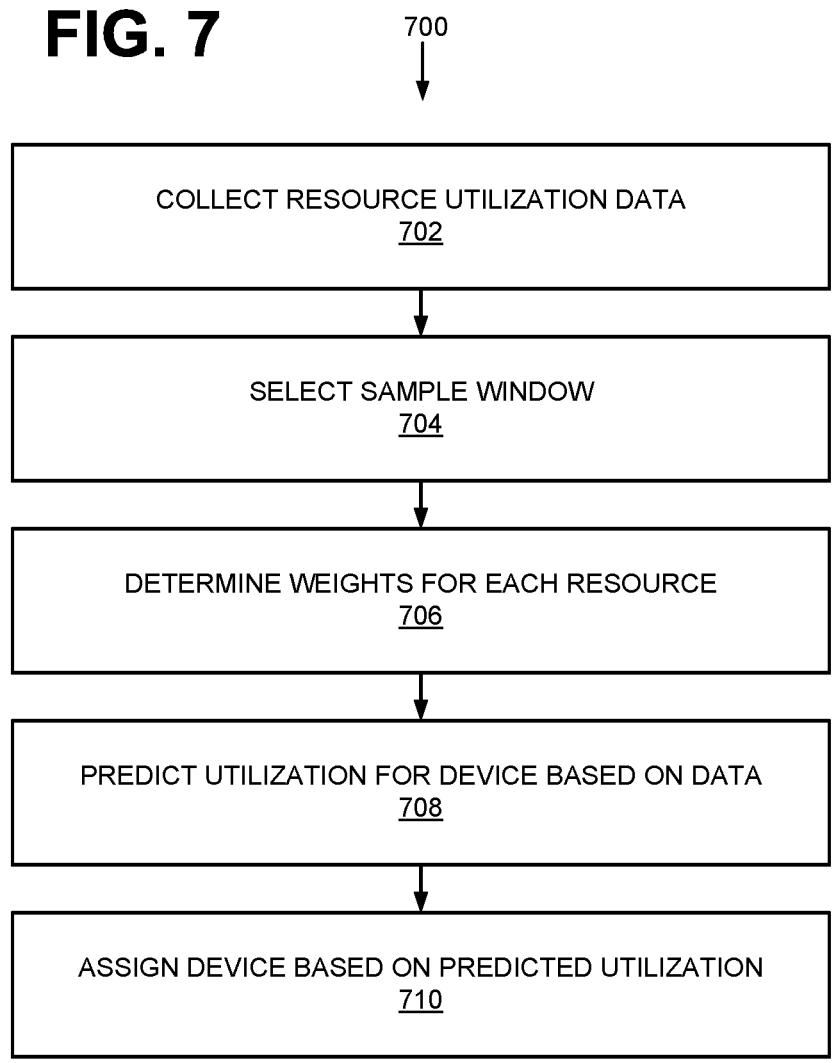

OPTIMUM RESOURCE ALLOCATION AND DEVICE ASSIGNMENT IN A MEC CLUSTER

BACKGROUND INFORMATION

In order to satisfy the needs and demands of users of mobile communication devices, providers of wireless communication services continue to improve available services. One enhancement made possible through new broadband cellular networks is the use of Multi-access Edge Computing (MEC) clusters (also referred to as Mobile Edge Computing clusters). The MEC clusters allow high network computing loads to be transferred onto edge servers. Depending on the location of the edge servers relative to the point of attachment (e.g., a wireless station for a user device), MEC clusters can provide various services and applications to user devices with minimal latency, jitter, and loss.

BRIEF DESCRIPTION OF THE DRAWINGS

FIG. 3 illustrates an exemplary functional components of the Multi-Access Edge Computing (MEC) cluster of FIG. 1;

FIG. 7 is a flow diagram of an exemplary process for predicting a future resource utilization value based on historical data and for selecting a MEC device to provide a service, based on the predicted value.

DETAILED DESCRIPTION OF PREFERRED EMBODIMENTS

The following detailed description refers to the accompanying drawings. The same reference numbers in different drawings may identify the same or similar elements.

A MEC cluster is a collection of MEC devices. A service provider may implement a MEC cluster to provide faster services with less latency to a device, a user equipment (UE) device, and/or Internet-of-Things (IoT) device that is attached to the network. Each MEC cluster may be positioned geographically close to the serviced devices (also referred to herein as "devices."). The close proximity of the MEC cluster reduces the average latency, jitter, and loss of the services rendered by the MEC cluster.

To ensure that MEC clusters render services with minimal latency, each MEC cluster is capable of handling heavy computational loads at high speeds. To allow the MEC clusters and devices to support attached device mobility or to provide service without abnormal latency, MEC clusters and devices need a mechanism to efficiently allocate and share resources for servicing the devices. For example, assume that a MEC cluster includes two MEC devices. A first of the MEC devices supports multiple devices and the second MEC device supports none. Also assume that the first MEC device is using 99% of its memory and 50% of its processing cycles to support the devices. When a roaming device attaches to the network in which the MEC cluster is located, the MEC cluster needs to assign the second MEC device to service the device and avoid overloading the first MEC device.

The systems and methods described herein relate to allocating MEC resources. Each MEC device may avoid rendering services with large latencies or being overloaded by evaluating when and how to share resources (e.g., Central Processing Unit (CPU) use, memory, port bandwidth, etc.) between the MEC devices and/or a remote data center. In addition, the MEC cluster or a remote data center may predict future utilization of MEC resources based on historical data, and determine on what MEC device an additional virtual network function (VNF) may be deployed based on the prediction.

Figure 1:
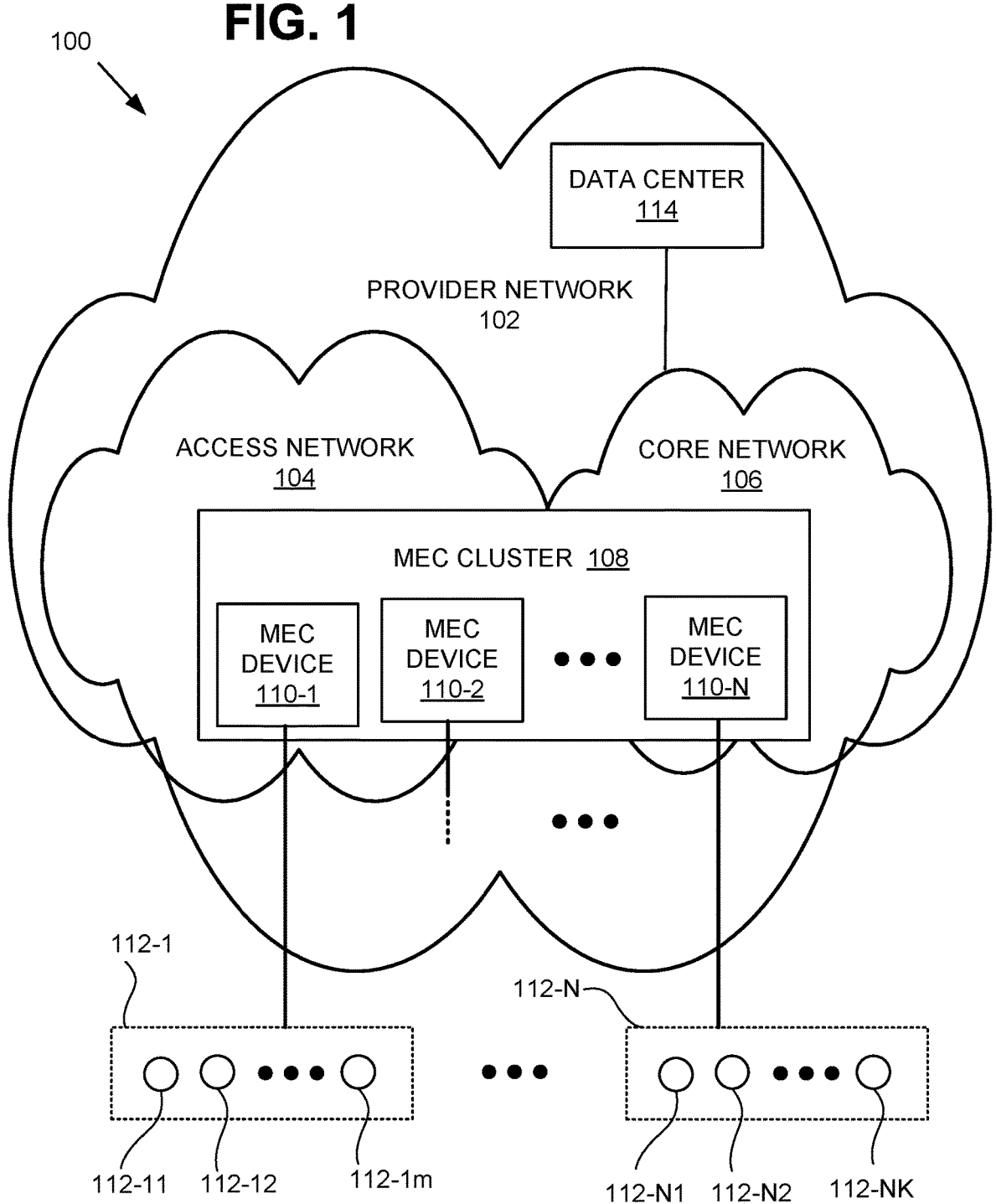
FIG. 1 illustrates an exemplary network environment in which the concepts described herein may be implemented.

FIG. 1 illustrates an exemplary network environment 100 in which the concepts described herein may be implemented. As shown in FIG. 1, environment 100 may include a provider network 102, and devices in groups 112-1 through 112-N. For simplicity, FIG. 1 does not show all components that may be included in network environment 100 (e.g., routers, bridges, wireless access point, additional networks, additional devices, etc.). That is, depending on the implementation, network environment 100 may include additional, fewer, different, or a different arrangement of components than those illustrated in FIG. 1.

Provider network 102 may provide communications services (e.g., Internet Protocol (IP) services) to devices 112. Provider network 102 may include a local area network (LAN), a wide area network (WAN), a metropolitan area network (MAN), a radio access network, an optical network, a cable television network, a satellite network, a wireless network (e.g., a CDMA network, a general packet radio service (GPRS) network, an Long Term Evolution (LTE) network (e.g., a Fourth Generation (4G) network), a Fifth Generation (5G) network, an ad hoc network, a telephone network (e.g., the Public Switched Telephone Network (PSTN), an intranet, or a combination of networks. Provider network 102 may interface with other external networks, such as a packet data network or another provider network.

Provider network 102 may include an access network 104, a core network 106, MEC cluster 108, a data canter 114, and, in some embodiments, a separate MEC cluster management system. Access network 104 may allow a device 112 to access core network 106. To do so, access network 104 may establish and maintain, with participation from devices 112, an over-the-air channel with the devices 112; and maintain backhaul channels with core network 106. Access network 104 may convey information through these channels, from the devices 112 to core network 106 and vice versa.

Access network 104 may include a Long-term Evolution (LTE) radio network and/or a 5G radio network or other advanced radio network. These radio networks may include many wireless stations, for establishing and maintaining an over-the-air channel with the devices 112.

A wireless station in access network 104 may include a 4G, 5G, or another type of wireless station (e.g., eNB, gNB, etc.) that includes one or more radio frequency (RF) transceivers. Such a wireless station (also referred to as a base station) may provide or support one or more of the following: carrier aggregation functions; advanced or massive multiple-input and multiple-output (MIMO) antenna functions (e.g., 8×8 antenna functions, 16×16 antenna functions, 256×256 antenna functions, etc.); cooperative MIMO (CO-MIMO) functions; relay stations; Heterogeneous Network (HetNets) of overlapping small cell-related functions; macrocell-related functions; Machine-Type Communications (MTC)-related functions, such as 1.4 MHz wide enhanced MTC (eMTC) channel-related functions (i.e., Cat-M1), Low Power Wide Area (LPWA)-related functions such as Narrow Band (NB) Internet-of-Thing (NB-IoT) technology-related functions, and/or other types of MTC technology-related functions; Dual Connectivity (DC), and other types of LTE-Advanced (LTE-A) and/or 5G-related functions. In some implementations, a wireless station may be part of an evolved UMTS Terrestrial Network (eUTRAN).

In some implementations, wireless stations may include or be coupled to a MEC cluster 108 or a MEC device. Such a MEC cluster/device is geographically close to devices 112 that are attached to provider network 102 via the wireless station, and thus may be capable of providing services with a minimal latency, jitter and loss.

Core network 106 may include a local area network (LAN), a wide area network (WAN), a metropolitan area network (MAN), an optical network, a cable television network, a satellite network, a wireless network (e.g., a CDMA network, a general packet radio service (GPRS) network, an LTE core network (e.g., a 4G network), a 5G core network, an ad hoc network, a telephone network (e.g., the Public Switched Telephone Network (PSTN), an intranet, or a combination of networks. Core network 106 may allow the delivery of IP services to devices 112, and may interface with other external networks, such as a packet data network. In some implementations, core network 106 may include one or more MEC clusters 108, although MEC clusters 108 are typically located at the edge of provider network 102.

As further shown in FIG. 1, provider network 102 may include one or more MEC clusters 108. Each MEC cluster 108 may provide services for devices 112 wirelessly attached to a base station in access network 104. MEC cluster 108 may be in geographical proximity to the base station or at other edges of provider network 104. As an example, MEC cluster 108 may be located on the same site as the base station. As another example, MEC cluster 108 may be geographically close to a 5G New Radio (NR) base station, and reachable via fewer network hops and/or fewer switches, than other base stations. As yet another example, MEC may be reached without having to interface with a gateway device, such as a 4G Packet Data Network Gateway (PGW) or a 5G User Plane Function (UPF). In some implementations, MEC cluster 108 may be located at customer premises, or at any other location to reduce latencies.

MEC cluster 108 may interface with access network 104 and/or with core network 106 via a MEC gateway device (not shown in FIG. 1). In some implementations, MEC cluster 108 may be connected to access network 104 via a direct connection to a base station. In other implementations, MEC cluster 108 may include, or be included in, core network 106. As an example, MEC cluster 108 may connect to a Session Management Function (SMF) or a UPF. MEC cluster 108 may support device mobility and handover application sessions between MEC cluster 108 and another MEC clusters.

MEC cluster 108 may support device registration, discovery, and/or management of MEC devices 110-1 through 110-N in MEC cluster 108. Each MEC device 110-X (herein individually referred to as MEC device 110 or collectively as MEC devices 110) may service each corresponding group of devices 112-X. For example, MEC device 110-1 services devices 112-1.

MEC device 110 may include software components, such as an operating system, virtual machine, virtual container, application, and/or another type of software components or programs as further described below with reference to FIG. 3. MEC device 110 may be connected to a base station in access network 104 and may provide one or more MEC services to devices connected to the base station. As an example, a MEC service may include a service associated with a particular application.

Data center 114 may include various network devices and applications with storage and computing resources. In some embodiments, data center 114 may be implemented as a cloud platform (e.g., Verizon® cloud platform (VCP)) or another type of platform. When the MEC cluster 108 servicing a particular device 112 is overloaded, data center 114 may provide the necessary resources to service the device 112.

As also shown in FIG. 1, network environment 100 includes groups 112-1 through 112-N of devices. If an index J (not shown in FIG. 1) denotes a particular group, then devices 112-J1 through 112-Jm (where J N) belong to the group J. That is, devices 112-J1 through 112-Jm are serviced by the corresponding MEC device 110-J, through communication channels through the corresponding base station. For example, devices 112-11 . . . 112-1m are serviced by MEC device 110-1.

Each device 112 (also referred to as UE device 112) may include a wireless communication device. Examples of device 112 include: a smart phone; a tablet device; a wearable computer device (e.g., a smart watch); a global positioning system (GPS) device; a laptop computer; a media playing device; an IoT device; and a portable gaming system. In some implementations, device 112 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. Device 112 may send packets over or to provider network 102.

In FIG. 1, each group 112 may include different or the same number of devices 112 than other groups 112. Furthermore, each device 112 may require the MEC device 110 servicing the device 112 to use a different amount of computational resources. Thus, it is possible that one MEC device 110 is requested to allocate resources to service devices 112 at levels beyond which the MEC performance rapidly degrades (e.g., large latencies), while resources of MEC device 110 are underutilized. To prevent the preceding situation, an orchestrator of MEC cluster 108 or Data Center may perform resource management over its member devices 110, as described below with reference to FIGS. 3-7.

Depending on the implementation, MEC devices 110 in MEC cluster 108 may be interconnected in a particular network topology. If MEC devices 110 that are in close proximity to each other are included in a cluster, each MEC device 110 would have two neighboring MEC devices 110. Assuming that there are 5 MEC devices 110 in MEC cluster 108, for example, and that MEC devices 110-1 and 110-5 are the MEC devices at the ends of the series, MEC device 110-2 would be a neighbor of MEC device 110-1, MEC device 110-3 would be a neighbor of MEC device 110-2, and so forth.

In FIG. 1, assume the computational cost of device 112-1J accessing MEC device 110-1 is denoted by $C_{D\text{-}MEC}$; and the computational cost of a MEC device 110 accessing its neighbor is $C_{MEC\text{-}MEC}$, where the computational cost may be memory, CPU cycles, bandwidth, physical links, etc. For simplicity, also assume that the computational costs of connectivity between any adjacent two MEC devices are the same and are represented by $C_{MEC-MEC}$. The cost of device 112-1J accessing MEC device 110-N is then given by:

$$C_{D-MEC-N} = C_{D-MEC} + (N-1) \cdot C_{MEC-MEC} \quad (1)$$

Expression (1) reflects the fact that, a device 112-1J that ends up accessing MEC device 110-N would first connect to MEC device 110-1, which would then hop through neighboring MEC devices 110-2 through 110-N−1 to reach MEC device 110-N. Thus, expression (1) represents the worst-case scenario performance cost that does not involve accessing data center 114. In many implementations, MEC cluster 108 may be designed to service devices 112 such that:

$$C_{D-REMOTE-MEC} \le C_{D-MEC-N} = C_{D-MEC} + (N-1) \cdot C_{MEC-MEC} \quad (2)$$

Where $C_{D-REMOTE-MEC}$ is the cost of accessing any one of the MECs other than MEC1 for device 112.

In some implementations, in addition to satisfying expression (2), MEC cluster 108 may also satisfy the requirement that the actual computational cost of accessing an application on MEC device 110-N is less than or equal to the computational cost of accessing another instance of the application on a remote data center 114 ($C_{D-CP}$).

$$C_{D-REMOTE-MEC} \le C_{D-CP} \quad (3)$$

If a particular application that may be considered a resource or that accesses a resource is installed only at the remote data center 114, MEC devices 110 need not satisfy expression (3). In many implementations, device 112 may access the data center 114 when there are not enough resources within MEC cluster 108, since the data center 114 performance will be inferior to that of the MEC device 110 for rendering a service.

In some implementations, MEC devices 110 may also satisfy the requirement:

$$RTD_{D-REMOTE-MEC} \le RTD_{D-CP} \quad (4)$$

under certain utilization of MEC devices 110 in the MEC cluster 108. In expression (4), $RTD_{D-REMOTE-MEC}$ denotes the round trip delay for device 112-IJ accessing MEC device 110-L, and $RTD_{D-CP}$ is the round trip delay for device 112-IJ accessing the data center 114. In the expression (4), it is possible to use one-way delay instead of round trip delay between I12-IJ and MEC device 110-L, and one-way delay between I12-IJ and the Data Center. If the memory utilization (E) and the CPU utilization (U) at MEC device 110-L remain less than thresholds α and β, respectively, MEC device 110-L may continue to service device 112-LJ.

Figure 2:
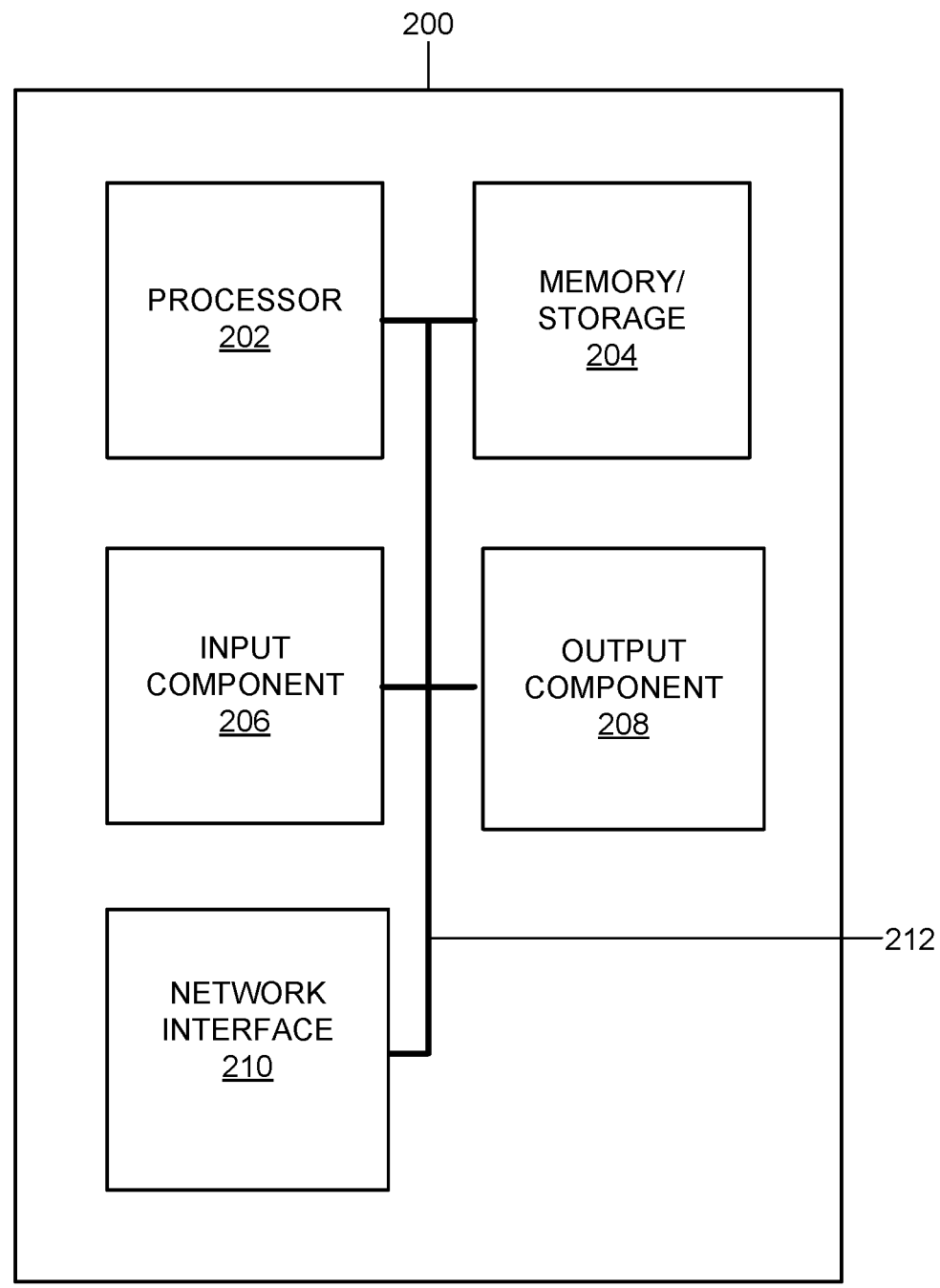
FIG. 2 depicts exemplary components of an exemplary network device.

FIG. 2 depicts exemplary components of an exemplary network device 200. Network device 200 may correspond to or may be included in any of network components of FIG. 1 (e.g., MEC devices 110, devices 112, a router, a network switch, servers, gateways, etc.). As shown, network device 200 may include a processor 202, memory/storage 204, input component 206, output component 208, network interface 210, and communication path 212. In different implementations, network device 200 may include additional, fewer, different, or a different arrangement of components than the ones illustrated in FIG. 2. For example, network device 200 may include a display, network card, etc.

Processor 202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 200 and/or executing programs/instructions.

Memory/storage 204 may include static memory, such as read only memory (ROM), and/or dynamic memory, such as random access memory (RAM), or onboard cache, for storing data and machine-readable instructions (e.g., programs, scripts, etc.).

Memory/storage 204 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 204 may be external to and/or removable from network device 200. Memory/storage 204 may include, for example, a Universal Serial Bus (USB) memory stick, a dongle, a hard disk, off-line storage, a Blu-Ray® disk (BD), etc. Memory/storage 204 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 206 and output component 208 may provide input and output from/to a user to/from device 200. Input/output components 206 and 208 may include a display screen, a keyboard, a mouse, a speaker, a microphone, a camera, a DVD reader, USB lines, and/or other types of components for obtaining, from physical events or phenomena, to and/or from signals that pertain to device 200.

Network interface 210 may include a transceiver (e.g., a transmitter and a receiver) for network device 200 to communicate with other devices and/or systems. For example, via network interface 210, network device 200 may communicate over a network, such as the Internet, an intranet, a terrestrial wireless network (e.g., a WLAN, WiFi, WiMax, etc.), a satellite-based network, optical network, etc.

Network interface 210 may include an Ethernet interface to a LAN, and/or an interface/connection for connecting device 200 to other devices (e.g., a Bluetooth interface). For example, network interface 210 may include a wireless modem for modulation and demodulation.

Communication path 212 may enable components of network device 200 to communicate with one another.

Network device 200 may perform the operations described herein in response to processor 202 executing software instructions stored in a non-transient computer-readable medium, such as memory/storage 204. The software instructions may be read into memory/storage from another computer-readable medium or from another device via network interface 210. The software instructions stored in memory/storage (e.g., memory/storage 204, when executed by processor 202, may cause processor 202 to perform processes that are described herein.

FIG. 3 illustrates exemplary functional components of MEC cluster 108 of FIG. 1. As noted above, MEC cluster 108 may include one or more MEC devices 110, each of which may include one or more network devices 200 that are configured to implement the functional components as hardware or software. The functional components may be part of software programs or modules. As shown, the functional components may include a cluster orchestrator 302, a device registry 304, a performance monitor 306, a resource utilization database 308, and machine learning logic 310.

Cluster orchestrator 302 may include logic for instantiating, terminating, and/or scheduling application and service processes, depending various constraints and parameters, such as priorities. For example, cluster orchestrator 302 may receive instructions from a network operator to start or end certain service and/or application processes, modify their priorities, and/or schedule their execution at particular virtual/physical hardware. In another example, cluster orchestrator 302 may obtain process-related instructions from an administrator program (e.g., a program running on a remote device) or from stored instructions. In yet another example, cluster orchestrator 302 may create instances of programs that include performance monitor 306 and machine learning logic 310.

Cluster orchestrator 302 may also assign hardware resources, to service specific devices 112, based on outputs from performance monitor 306, information in device registry 304 and data in resource utilization database 308. Additionally, cluster orchestrator 302 may assign a particular MEC device 110 to service a device 112 based on outputs from machine learning logic 310 and data in resource utilization database 308. Processes that cluster orchestrator 302 perform for MEC resource allocation and MEC device 110 assignment are described below with reference to FIGS. 5-7.

Device registry 304 may include information pertaining to each of MEC devices 110. To perform many of its functions, cluster orchestrator 302 needs a list of MEC devices 110. Device registry 304 stores and maintains such a list. Typically, device registry 304 may include identifiers for MEC devices 110 (e.g., Media Access Control (MAC) address, IP address, etc.), for hardware components (e.g., memory, CPUs, network interfaces, etc.), and/or for other device-related information (e.g., what software components are installed at MEC devices 110). When a MEC device 110 is brought online and becomes part of MEC cluster 108, cluster orchestrator 302 registers the MEC device 110 at registry 304, populating registry 304 with data pertaining to the MEC device 110. Conversely, if MEC device 110 is removed from MEC cluster 108, cluster orchestrator 302 de-registers MEC device 110, removing the data from registry 304. Examples of registry information includes: the amount of RAM for each MEC device 110; the number of CPUs, identifiers associated with each CPU, and the CPU speeds; the number of network interfaces and their bandwidths; a list of software components installed at MEC devices 110; etc.

Device registry 304 may also include a cluster identifier that uniquely identifies the cluster 108. There may be more than one MEC cluster 108 in network 102, and in such instances, provider network 102 may include a MEC orchestrator that oversees the clusters. The MEC orchestrator may provide a cluster ID to cluster orchestrator 302, which would then store the cluster ID in device registry 304.

Device registry 304 may also store network configuration information. For example, registry 304 may indicate the network topology of MEC cluster 108 (e.g., star, ring, etc.). In one implementation, MEC devices 110 may be interconnected as a ring; each MEC device 110 is connected to one MEC device 110 to its left and one MEC device 110 to its right. In another implementation, MEC devices 110 may be arranged in a line: except for two MEC devices 110 at the ends of the line, each MEC device 110 is connected to one MEC device 110 to its left and one MEC device 110 to its right. Device registry 304 may identify, for each MEC device 110 in registry 304, to what other devices the MEC device 110 is connected.

Performance monitor 306 may track resource utilization and performance data for each MEC device 110. To monitor resource utilization for each MEC devices 110, performance monitor 306 may issue system-level calls to hardware management programs (e.g., Operating System (OS)) on each MEC device 110. When the programs return values of parameters indicating the amounts of resources in use, performance monitor 306 may store the returned values in database 308.

Resource utilization database 308 may store values of parameters that performance monitor 306 obtains from MEC devices 110. In some implementations, database 308 may be updated periodically or at scheduled times.

Machine learning logic 310 may use values of parameters, to obtain (or learn) the coefficients of a set of linear equations for predicting a future value of the parameter. Machine learning logic 310 may be used by cluster orchestrator 302 to predict the future use of a particular resource, and to assign a MEC device 110 to a VNF (Virtual Network Function) based on the prediction.

Depending on the implementation, MEC cluster 108 may include additional, fewer, or different functional components than those illustrated in FIG. 3. Furthermore, some of the components (or similar components) may be included in other components of provider network 104, such as data center 114, to provide services or resources to devices 112 when MEC devices 110 determines that they are unable to meet the required performance constraints.

Figure 4A:
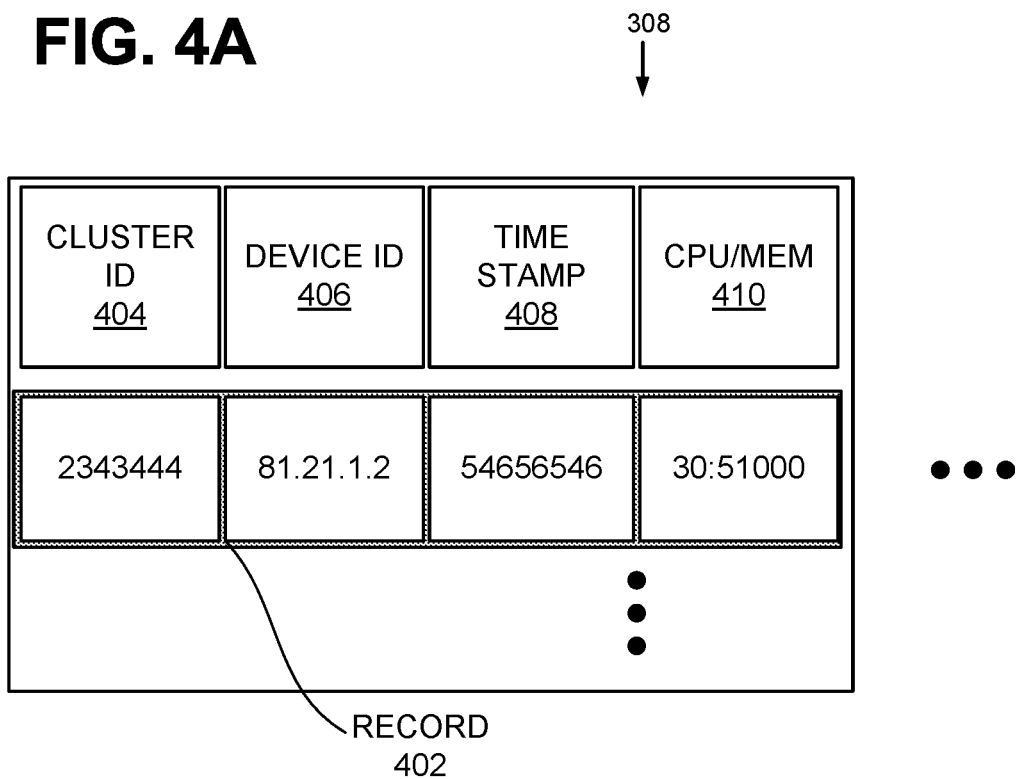
FIGS. 4A and 4B show exemplary components of a table in the resource utilization database of FIG. 3 according to one implementation.
Figure 4B:
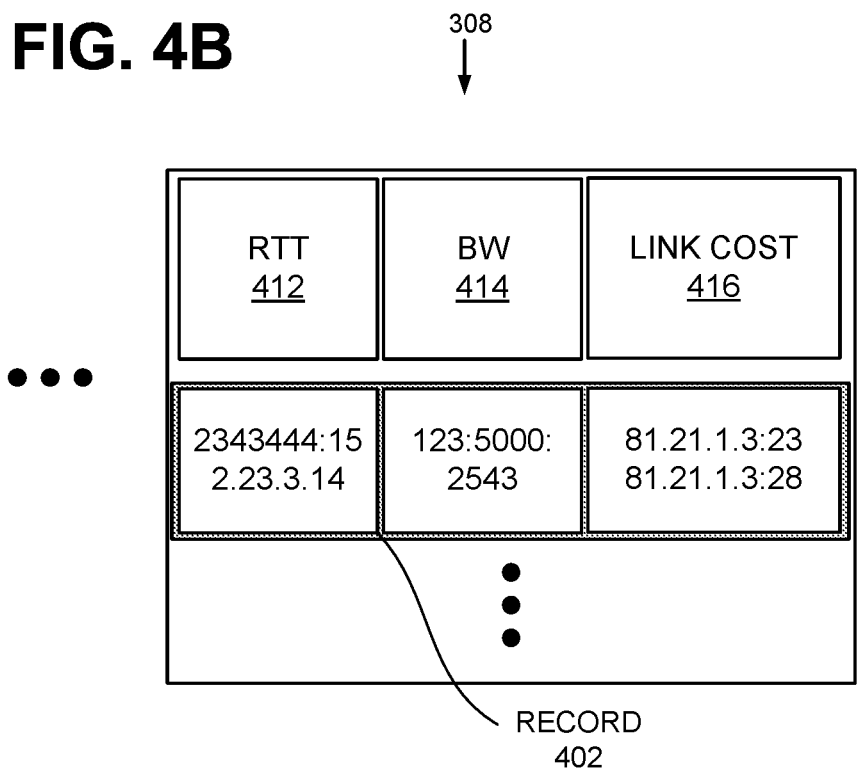

FIGS. 4A and 4B show exemplary components of a table in resource utilization database 308 according to one implementation. As shown, database 308 may include a table with records 402. Each record 402 may include a cluster identifier (ID) field 404, a device ID field 406, a time stamp field 408, a CPU/MEM field 410, an RTD field 412, a bandwidth (BW) field 414, and a link cost field 416.

Cluster ID field 404 may store an identifier that is associated with the cluster. The cluster ID may have been provided to cluster orchestrator 302 by a MEC orchestrator. Device ID field 406 may store an identifier that uniquely identifies the MEC device 110 in the cluster. The identifier may be an IP address, a MAC address, or another type of identifier.

Time stamp field 408 may store a timestamp that indicates the time at which one or more resource utilization parameter values are obtained and stored in database 308. The time may be expressed as a number of seconds or milliseconds that elapsed since a particular epoch (e.g., Jan. 1, 1970).

CPU/MEM field 410 may include the amount of memory or percentage of CPU cycles when the timestamp value was obtained. In one implementation, CPU utilization may be indicated as a percent of total CPU cycles per second, and, memory utilization may be indicated in megabytes, terabytes, percent of the total available RAM, etc.

RTT field 412 may indicate an average round trip time for a packet issued from a particular device 112 to the MEC device 110 identified in device ID field 406. Although FIG. 4B shows RTT field 412 as having only a single RTT value for a corresponding device 112 (whose IP address is shown), in other implementations, RTT field 412 may include additional RTT values. Each of such RTT values may correspond to a device 112 that MEC device 110 services.

BW field 414 may include a list of ports/interfaces and their corresponding used or available bandwidth. Link cost field 416 may indicate a computational cost associated with a link. Depending on the implementation, the cost may be given in terms of an amount of specific resource used, for accessing another MEC device 110. For example, link cost field 416 may indicate the cost for connecting to another MEC device 110 to its right, or to another MEC device 110 to its left and accessing its memory. In other examples, the cost may be a round trip delay, additional memory utilization, CPU cycles, etc. for accessing another MEC device 110.

Depending on the implementation, record 402 may include additional, fewer, or different fields than those illustrated in FIGS. 4A and 4B. For example, in one implementation, record 402 may not include a cluster ID field 404, and in another implementation, record 402 may include a list of devices 112 serviced by the MEC device 110.

Figure 5:
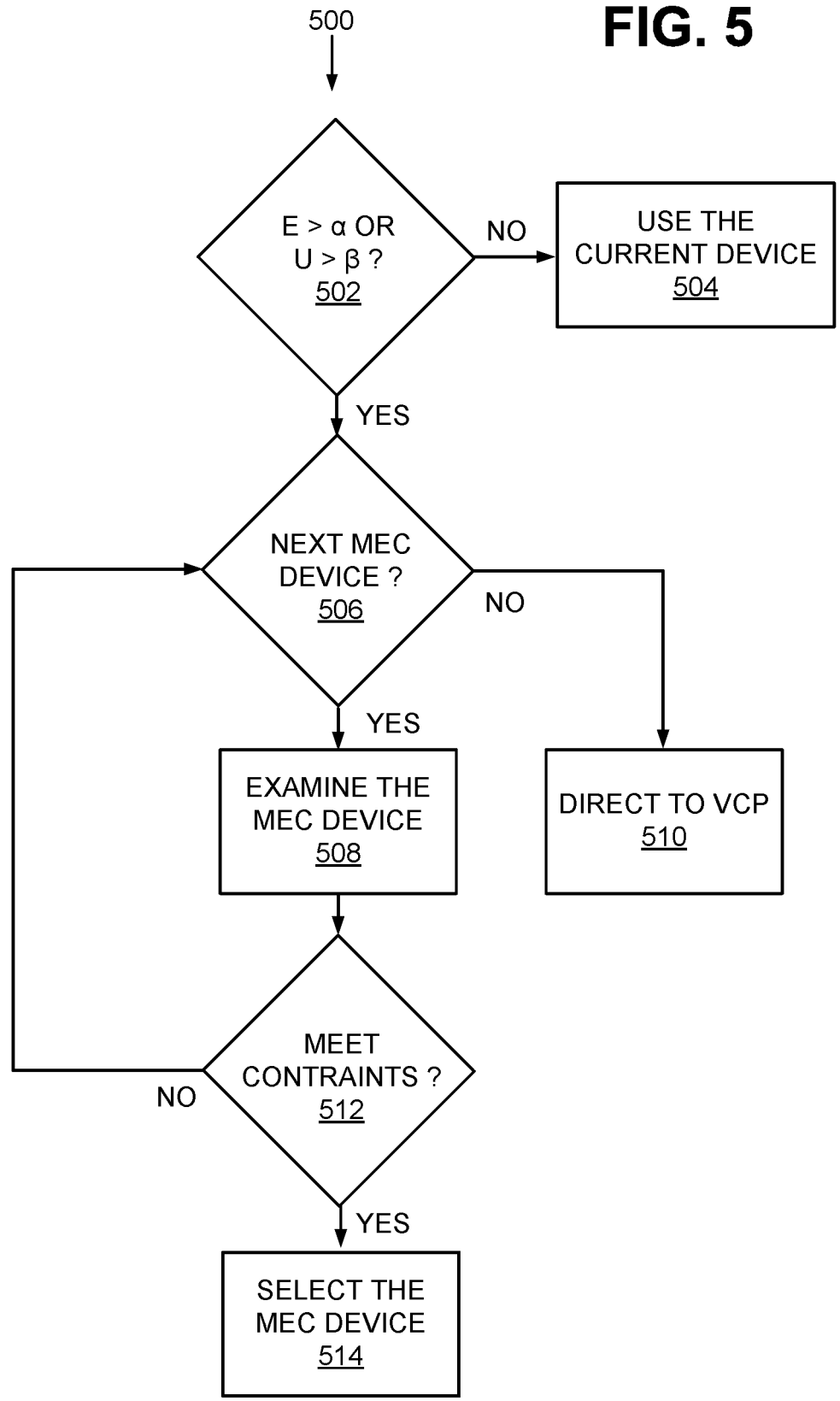
FIG. 5 is a flow diagram of an exemplary process that is associated with allocation of resources from the MEC devices and the data center of FIG. 1, according to one implementation.

FIG. 5 is a flow diagram of an exemplary process 500 that is associated with allocation of resources from MEC devices 110 and data center 114, according to one implementation. Cluster orchestrator 302 may perform process 500 for a particular MEC device 110-1, which may be a default MEC device for providing a particular service or the current MEC device 110 providing a service that needs additional resource.

As shown, process 500 may include determining whether the amount of memory (E) used at MEC device 110-1 exceeds a threshold ($\alpha$) or the CPU utilization (U) exceeds another threshold ($\beta$) (block 502). That is, cluster orchestrator 302 may determine whether E>$\alpha$ and/or U>$\beta$. In one implementation, the determination may be triggered by an event that requires a new process, thread, additional memory, etc (e.g., a service request from device 112), etc. In another implementation, the determination may be triggered by a separate thread or a process that checks resource utilization at the MEC device 110 at regular time intervals. The determination may be made, for example, by examining the contents of CPU/MEM field 410 of record 402 in resource utilization database 308 or inspecting outputs from performance monitor 306.

If E≤$\alpha$ and U≤$\beta$ (block 502: NO), cluster orchestrator 302 may allow the current MEC device 110 to handle the service (block 504). Otherwise (block 502: YES), cluster orchestrator 302 may determine whether there exists a candidate MEC device 110 that can provide the resource (e.g., a MEC device 110 that is a neighbor of MEC device 110-1) (block 506). If there is no candidate MEC device 110 (block 506: NO), cluster orchestrator 302 may direct the requested service to data center 114 (block 510), provided that expression (4) is satisfied.

If there is an available candidate MEC device 110 (block 506: YES), cluster orchestrator 302 may examine memory utilization and CPU utilization for the candidate MEC device 110 (block 508), and determine, based on the data (obtained from database 308 or performance monitor 306), whether the candidate MEC device 110 meets constraints (block 512). For example, cluster orchestrator 302 may determine whether the candidate MEC device 110 meets the criteria: $E_{CANDIDATE} \leq \alpha$ and $U_{CANDIDATE} \leq \beta$, and $B_{CANDIDATE} \leq \gamma$, where $E_{CANDIDATE}$, $U_{CANDIDATE}$, $B_{CANDIDATE}$, and $\gamma$ denote memory utilization, CPU utilization, port bandwidth utilization, and a bandwidth use threshold at the candidate MEC device 110.

If the MEC device 110 meets the constraints (block 512: YES), cluster orchestrator 302 may select the candidate MEC device 110 to provide the requested service or resource (block 514). Otherwise (block 512: NO), cluster orchestrator 302 may return to block 506 to consider whether another candidate MEC device 110 is available.

For process 500 it is assumed that $\alpha$, $\beta$, and $\gamma$ are the same for all MEC devices 110 in cluster 108. However, in a different implementation, resource utilization database 308 may store individualized memory, CPU, and port bandwidth threshold values for each MEC device 110. In such implementations, cluster orchestrator 302 may use the individualized threshold values for each MEC device 110 in determining whether to access the MEC device 110, for more precise resource allocation.

As indicated above, in addition to determining whether to allocate a resource from a MEC device 110, cluster orchestrator 302 may also predict future resource utilization based on historical data. Such predictions may be used for MEC capacity planning as well as for assigning MEC devices 110 for VNFs (i.e., run a VNF on a selected MEC device 110).

Figure 6:
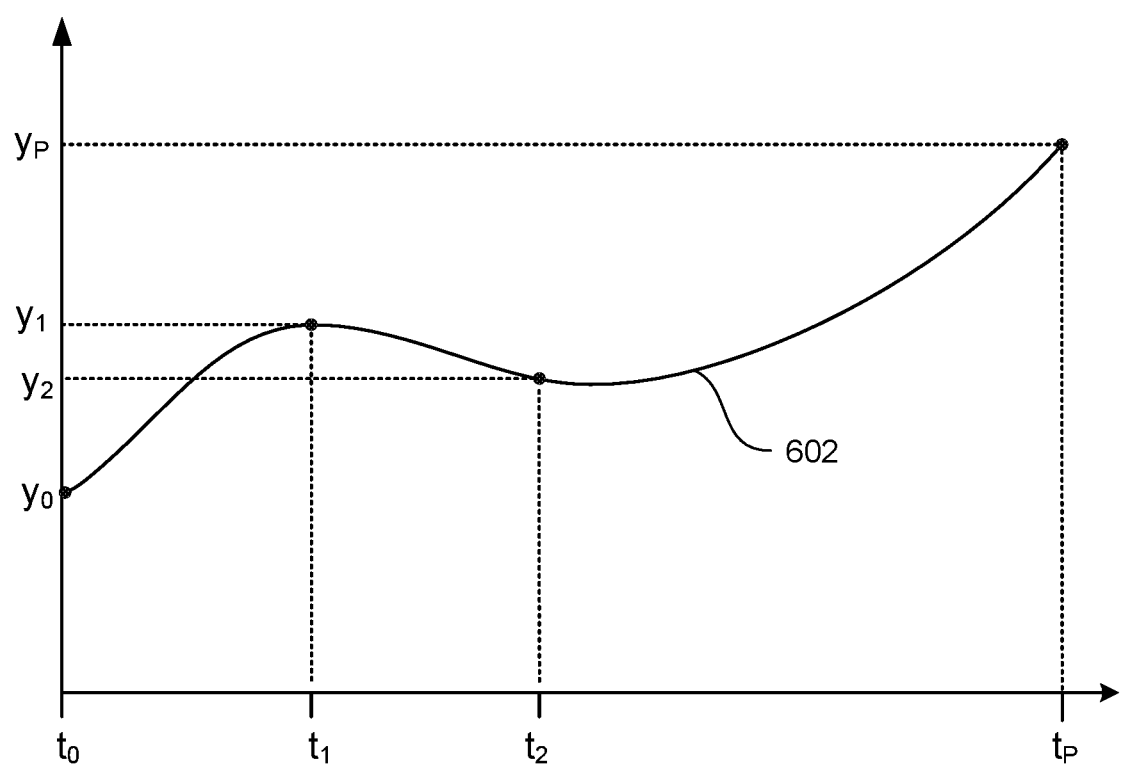
FIG. 6 is an exemplary graph of historical data and a future resource utilization value computed based on the historical data.

FIG. 6 is an exemplary graph of historical data and a future resource utilization value computed based on the historical data. FIG. 6 also illustrates the concept behind predicting the resource utilization value. In FIG. 6, historical data for resource utilization at a MEC device 110 is plotted for times at which the data were collected. More specifically, $y_0$, $y_1$, and $y_2$ are measured resource utilization values at times $t_0$, $t_1$, and $t_2$. To predict the future resource utilization, cluster orchestrator 302 determines a curve 602 that best fits the historical data, and looks up (or interpolates) the value of curve 602 at $t_p$, the time for which cluster orchestrator 302 needs to predict the resource utilization value. As shown in FIG. 6, the value is $y_p$. Once $y_p$ has been determined for each MEC device 110, cluster orchestrator 302 may use the determined values to identify MEC devices 110 that are least used, and select the least used MEC devices 110 to provide a resource of a service (e.g., a VNF).

FIG. 7 is a flow diagram of an exemplary process 700 for predicting a future resource utilization value based on historical data and for selecting a MEC device 110 to provide a service, based on the predicted value. Depending on the implementation, process 700 may be performed by cluster orchestrator 302 or another program running on one of MEC devices 110 in cluster 108.

As shown, process 700 may include collecting resource utilization data (block 702). For example, cluster orchestrator 302 may start and run performance monitor 306, which, in turn, may collect resource utilization data from MEC devices 110 and store the collected data in database 308. After the data has been collected, to predict a future resource utilization value, cluster orchestrator 302 may select an appropriate time window during which historical data has been collected (block 704). In addition, cluster orchestrator 302 may select data points, within the time window, obtained at specific times (e.g., every 5 minutes, every 10 minutes, every 15 minutes, etc.). Cluster orchestrator 302 may use the selected data within the time window for predicting the resource utilization value at a particular time t.

In one implementation, to predict the utilization value, cluster orchestrator 302 uses the selected data for machine learning. The machine learning is based on a mathematical relationship between resource utilization values $y_0$, $y_1$, $y_2$ . . . and $y_p$ and times $t_0$, $t_1$, $t_2$ . . . and $t_p$ at which the values were obtained. The relationship can be written as:

$$y_r \approx y_0 + T_r^T \cdot W \quad (5)$$

$T_r$ and W are defined as:

$$T_r = \begin{bmatrix} t_1 \\ t_2 \\ \vdots \\ t_r \end{bmatrix} \text{ and } W = \begin{bmatrix} w_1 \\ w_2 \\ \vdots \\ w_r \end{bmatrix}.$$

In expression (5), W is the unknown vector being solved for and $T_r T$ is a transpose of $T_r$. In this implementation, "machine learning" entails solving for the values of W. To solve for W, form the Least Squares Cost function based on expression (5) as follows:

$$G(W) = \sum_{r=1}^{p} (y_0 + T_r^T W - y_r)^2 \tag{6}$$

The cost function G(W) can be minimized by selecting the weights W. To select the weights, solve:

$$\nabla G(W) = 0 \tag{7}$$

$\nabla G(W)$ is the gradient of G(W). Taking partial derivatives of G(W) using expression (6) to obtain the gradient, and then using expression (7) yields:

$$\nabla G(W) = 2\sum_{r=1}^{p} T_r(y_0 + T_r^T W - y_r) = 0 \tag{8}$$

Expression (8) can be rewritten as:

$$\sum_{r=1}^{p} T_r y_0 + \sum_{r=1}^{p} T_r T_r^T W - \sum_{r=1}^{p} T_r y_r = 0 \tag{9}$$

Cluster orchestrator 302 may solve equation (9) to obtain W (i.e., values of $w_1, w_2 \ldots$ and $w_p$). Solving for W yields:

$$W = \left(\sum_{r=1}^{p} T_r T_r^T\right)^{-1} \left(\sum_{r=1}^{p} T_r y_r - \sum_{r=1}^{p} T_r y_0\right) \tag{10}$$

Once W is obtained, cluster orchestrator 302 may use a version of the following expression (11) to compute $y_t$. The expression is:

$$y_t \approx y_0 + T_t^T \cdot W \tag{11}$$

$T_t$ in expression (11) is defined as $T_r$ at $t_0 = t_1 = t_2 = \ldots t_r = t$. That is:

$$T_t = \begin{bmatrix} t \\ t \\ \vdots \\ t \end{bmatrix}.$$

Using expression (11), cluster orchestrator 302 may predict the resource utilization $y_t$ at time t based on the data (block 708).

In the above, expressions (5)-(11) deal with the situation where the outputs are assumed to be linear. For a non-linear case, $$y_r \approx y_0 + F_r^T \cdot W \tag{12}$$

where $$F_r = \begin{bmatrix} f(t_1) \\ f(t_2) \\ \vdots \\ f(t_r) \end{bmatrix} \text{ and } W = \begin{bmatrix} w_1 \\ w_2 \\ \vdots \\ w_r \end{bmatrix}.$$

Each $f(t)$ can be a sinusoidal function, such as $\sin(2\pi t_r)$. To solve for W, form the Least Squares Cost function based on expression (12) similarly as above:

$$G(W) = \sum_{r=1}^{p} (y_0 + F_r^T W - y_r)^2 \tag{13}$$

As before, find $\nabla G(W)$ by taking partial derivatives of G(W) and set it equal to zero to obtain:

$$\nabla G(W) = 2\sum_{r=1}^{p} F_r(y_0 + F_r^T W - y_r) = 0 \tag{14}$$

Expression (14) can be rewritten as:

$$\sum_{r=1}^{p} F_r y_0 + \sum_{r=1}^{p} F_r F_r^T W - \sum_{r=1}^{p} F_r y_r = 0 \tag{15}$$

Cluster orchestrator 302 may solve equation (9) to obtain W (i.e., values of $w_1, w_2 \ldots$ and $w_p$). Solving for W yields:

$$W = \left(\sum_{r=1}^{p} F_r F_r^T\right)^{-1} \left(\sum_{r=1}^{p} F_r y_r - \sum_{r=1}^{p} F_r y_0\right) \tag{16}$$

Once W is obtained, cluster orchestrator 302 may use a version of the following expression (17) to compute $y_t$. The expression is:

$$y_t \approx y_0 + F_t^T \cdot W \tag{17}$$

$F_t$ in expression (17) is defined as $F_r$ at $t_0 = t_1 = t_2 \ldots t_r = t$. That is:

$$F_t = \begin{bmatrix} f(t) \\ f(t) \\ \vdots \\ f(t) \end{bmatrix}.$$

In process 700, the predicted utilization $y_t$ depends on the resource utilization data (i.e., $y_0, y_1, y_2$, etc.) and the times at which the data were collected by performance monitor

306. For example, assume that performance monitor 306 makes measurements 5 minutes apart (i.e., $t_0=0$, $t_1=5$, $t_2=10$ . . . in minutes). Cluster orchestrator 302 may then use the above expressions (5)-(10) to determine $y_t$ at $t=20$ minutes from the start. In another example, the time measurements may be one day apart (e.g., $t_1=1$, $t_2=2$ . . . in days). The data may be used to predict the resource utilization for the next 5 days. Other time intervals may be used (e.g., monthly, quarterly, etc.).

If performance monitor 306 measures resource utilization every minute, and creates sets of 5 minute or 10 minute (or any predetermined period) historical measurements (e.g., average resource utilization values, maximum resource utilization values, etc.). Database 308 may include such measurements for a certain time interval in a day (e.g., 9 a.m.-3 p.m., 3 p.m.-6 p.m., etc.) and use. Cluster orchestrator 302 may use the measurements to predict resource use for the same time interval in another day.

Returning to FIG. 7, cluster orchestrator 302 may determine which MEC device 110 to provide a resource (block 710). For example, cluster orchestrator 302 may use the preceding part of process 700 to install or instantiate a virtual network function (VNF) at a selected MEC device 110. More specifically, assume that $y_p$ represents how many times a specific VNF is accessed for different time slots. Depending on the predicted VNF access number, cluster orchestrator 302 may assign the next VNF instance to a particular MEC device 110 (e.g., at a MEC device with a low predicted VNF access count). In another example, if cluster orchestrator 302 predicts that resource utilization at all MEC devices 110 in cluster 108 will be over their thresholds, cluster orchestrator 302 may indicate a need for additional hardware (e.g., additional MEC device 110, additional network ports, more RAM for MEC devices 110, etc.).

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A network device in a Multi-Access Edge Computing (MEC) cluster, comprising:
    a processor configured to:
        receive, over a network, a request for a service that requires use of a resource of a first type;
        determine whether a resource utilization level, associated with the resource, at a MEC device in the MEC cluster exceeds a threshold, wherein the MEC device includes a first MEC device in the MEC cluster;
        when the resource utilization level exceeds the threshold,
            determine whether a candidate MEC device is available within the MEC cluster to provide a resource of the first type, wherein the candidate MEC device includes an $N^{th}$ MEC device in the MEC cluster and N is a number greater than one; and
            enable the service to be provided, wherein when the processor enables the service, the processor is to either:
                access a first additional resource of the first type from the candidate MEC device or from a different MEC device; or
                direct the request to a data center that is connected to the network; and
        when the resource utilization level does not exceed the threshold,
    allocate a second additional resource of the first type from the MEC device,
    wherein the MEC device and the candidate MEC device are configured such that a first cost of a device accessing the candidate MEC device is less than or equal to a sum of a second cost of the device accessing the MEC device and N−1 times a third cost of the MEC device accessing an adjacent MEC device in the MEC cluster.

2. The network device of claim 1, wherein the network device includes the MEC device.

3. The network device of claim 1, wherein when the processor enables the service to be provided, the processor is configured to:
    determine if the candidate MEC device meets resource requirements,
    wherein when the processor accesses the first additional resource, the processor is to:
        access the first additional resource of the first type from the candidate MEC device to provide the service when the processor determines that the candidate MEC device meets the resource requirements.

4. The network device of claim 3, wherein when the processor directs the request to the data center, the processor is to:
    direct the request to the data center when the processor determines that the candidate MEC device does not meet the resource requirements.

5. The network device of claim 3, wherein when the processor determines that the candidate MEC device meets the resource requirements, the processor is to determine if the candidate MEC device has sufficient memory, a sufficient processor capacity, and a sufficient port bandwidth.

6. The network device of claim 1, wherein a first round trip delay for the device to access the MEC device is less than or equal to a second round trip delay for the device to access the data center.

7. The network device of claim 1, wherein a first cost for the device to access the MEC device is less than or equal to a second cost for the device to access the data center.

8. A method comprising:
receiving, over a network and at a network device in a Multi-Access Edge Computing (MEC) cluster, a request for a service that requires use of a resource of a first type;
determining, by the network device, whether a resource utilization level, associated with the resource, at a MEC device exceeds a threshold, wherein the MEC device includes a first MEC device in the MEC cluster;
when the network device determines that the resource utilization level exceeds the threshold,
determining, by the network device, whether a candidate MEC device is available within the MEC cluster to provide a resource of the first type, wherein the candidate MEC device includes an $N^{th}$ MEC device in the MEC cluster and N is a number greater than one; and
enabling, by the network device, the service to be provided, wherein enabling includes one of:
accessing, by the network device, a first additional resource of the first type from the candidate MEC device or a different MEC device; or
directing, by the network device, the request to a data center that is connected to the network; and
when the network device determines that the resource utilization level does not exceed the threshold,
allocating, by the network device, a second additional resource of the first type from the MEC device,
wherein the MEC device and the candidate MEC device are configured such that a first cost of a device accessing the candidate MEC device is less than or equal to a sum of a second cost of the device accessing the MEC device and N−1 times a third cost of the MEC device accessing an adjacent MEC device in the MEC cluster.

9. The method of claim 8, wherein the network device includes the MEC device.

10. The method of claim 8, wherein enabling the service to be provided includes determining if the candidate MEC device meets resource requirements,
wherein accessing the first additional resource includes:
accessing the first additional resource of the first type from the candidate MEC device to provide the service when the network device determines that the candidate MEC device meets the resource requirements.

11. The method of claim 10, wherein directing the request to the data center includes:
directing the request to the data center when the network device determines that the candidate MEC device does not meet the resource requirements.

12. The method of claim 10, wherein determining if the candidate MEC device meets the resource requirements includes determining if the candidate MEC device has sufficient memory, a sufficient processor capacity, and a sufficient port bandwidth.

13. The method of claim 8, wherein a first round trip delay for the device to access the MEC device is less than or equal to a second round trip delay for the device to access the data center.

14. The method of claim 8, wherein a first cost for the device to access the MEC device is less than or equal to a second cost for the device to access the data center.

15. A non-transitory computer-readable medium comprising computer-executable instructions, that when executed by a processor of a network device in a Multi-Access Edge Computing (MEC) cluster, cause the processor to:
receive, over a network, a request for a service that requires use of a resource of a first type;
determine whether a resource utilization level, associated with the resource, at a MEC device exceeds a threshold, wherein the MEC device includes a first MEC device in the MEC cluster;
when the processor determines that the resource utilization level exceeds the threshold, the processor is to:
determine whether a candidate MEC device is available within the MEC cluster to provide a resource of the first type, wherein the candidate MEC device includes an $N^{th}$ MEC device in the MEC cluster and N is a number greater than one; and
enable the service to be provided, wherein when the processor enables the service, the processor is to:
access a first additional resource of the first type from the candidate MEC device or a different MEC device; or
direct the request to a data center that is connected to the network; and
when the processor determines that the resource utilization level does not exceed the threshold, the processor is to:
allocate a second additional resource of the first type from the MEC device,
wherein the MEC device and the candidate MEC device are configured such that a first cost of a device accessing the candidate MEC device is less than or equal to a sum of a second cost of the device accessing the MEC device and N−1 times a third cost of the MEC device accessing an adjacent MEC device in the MEC cluster.

16. The non-transitory computer-readable medium of claim 15, wherein the network device includes the MEC device.

17. The non-transitory computer-readable medium of claim 15, wherein when the processor enables the service, the processor is to determine if the candidate MEC device meets resource requirements,
wherein when the processor accesses the first additional resource, the processor is to:
access the first additional resource of the first type from the candidate MEC device to provide the service when the processor determines that the candidate MEC device meets the resource requirements.

18. The non-transitory computer-readable medium of claim 17, wherein when the processor directs the request to the data center, the processor is to:
direct the request to the data center when the processor determines that the candidate MEC device does not meet the resource requirements.

19. The non-transitory computer-readable medium of claim 15, wherein a first round trip delay for the device to access the MEC device is less than or equal to a second round trip time delay for the device to access the data center.

20. The non-transitory computer-readable medium of claim 15, wherein a first cost for the device to access the MEC device is less than or equal to a second cost for the device to access the data center.

\* \* \* \* \*